United States Patent [19]

Bieringer et al.

[11] Patent Number: 5,094,877
[45] Date of Patent: Mar. 10, 1992

[54] METHOD OF COATING SURFACES WITH A PLASTIC AND METAL MIXTURE

[75] Inventors: Heimo Bieringer, Schörfling; Manfred Schobesberger, Seewalchen; Klaus Weinrotter, Vöcklabruck, all of Austria

[73] Assignee: Lenzing AG, Lenzing, Austria

[21] Appl. No.: 517,203

[22] Filed: May 1, 1990

[30] Foreign Application Priority Data

May 3, 1989 [AT] Austria ................................ 1055/89

[51] Int. Cl.$^5$ .............................................. B05D 1/10
[52] U.S. Cl. ...................................... 427/34; 427/201; 427/423; 75/252
[58] Field of Search ............... 427/34, 423, 427, 201; 219/121.47; 75/252

[56] References Cited

U.S. PATENT DOCUMENTS

| 3,723,165 | 3/1973 | Longo et al. ........................ 75/252 |
| 4,759,957 | 7/1988 | Eaton et al. ........................ 427/423 |
| 4,897,227 | 1/1990 | Wanek et al. ........................ 264/6 |

FOREIGN PATENT DOCUMENTS

| 59-168932 | 9/1984 | Japan ........................ 427/34 |
| 59-222566 | 12/1984 | Japan ........................ 427/34 |

Primary Examiner—Shrive Beck
Assistant Examiner—Terry J. Owens
Attorney, Agent, or Firm—Kenyon & Kenyon

[57] ABSTRACT

Surfaces are coated by flame spraying onto the surfaces a powder mixture including a high-temperature resistant plastic and a metal, the high-temperature resistant plastic being a polyimide having a glass transition point of above 250° C. and containing low-molecular emittable components in an amount of at least 1.0% by weight, preferably of between 1.0 and 10% by weight.

8 Claims, No Drawings

METHOD OF COATING SURFACES WITH A PLASTIC AND METAL MIXTURE

The invention relates to a method of coating surfaces by flame spraying a powder mixture of a high-temperature resistant plastic and a metal.

Such a method is known from U.S. Pat. No. 3,723,165. Among others, also a polyimide is mentioned as a high-temperature resistant plastic, and aluminum alloys, nickel, copper and bronze, i.a., are cited as metals. By flame spraying a powder mixture of these components, hard corrosion resistant coatings can be applied to various surfaces.

However, with this method it is possible to apply coatings of a satisfactory quality only if the plastic powder used has a relatively narrow particle size distribution range. Moreover, it is disadvantageous that only such polyimides may be processed whose glass transition point lies below 250° C.

Due to this limitation, the temperature resistance of the presently producible polyimide coatings frequently is not sufficiently satisfactory for certain applications.

The invention aims at avoiding these disadvantages and has as its object to provide a method of the initially defined kind which allows for the production of flame-retardant and particularly temperature resistant coatings.

In accordance with the invention, this object is achieved in that a polyimide having a glass transition point of above 250° C. and containing low-molecular emittable components in an amount of at least 1.0% by weight, preferably of between 1.0 and 10% by weight, is used as the high-temperature resistant plastic material.

Successful processing has proved to be possible only if this lower limit of 1.0% by weight of emittable components is not fallen short of, which term implies substances that escape from the polyimide in a temperature range of between 150° and 350° C.

The process of the present invention provides a feasible means of producing high-temperature resistant surface coatings of an excellent quality.

The method according to the invention is particularly suited to process polyimides having structural units of the general formula

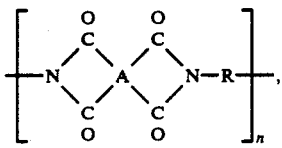

wherein n is an integer larger than 1 and A is a four-valent aromatic group selected from

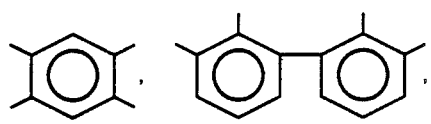

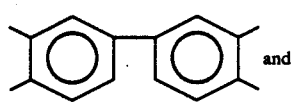

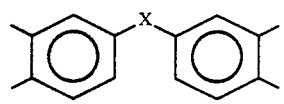

wherein X is selected from the group consisting of CO, $CH_2$, O, S and $CF_2$ and R represents at least one two-valent aromatic group selected from the group consisting of

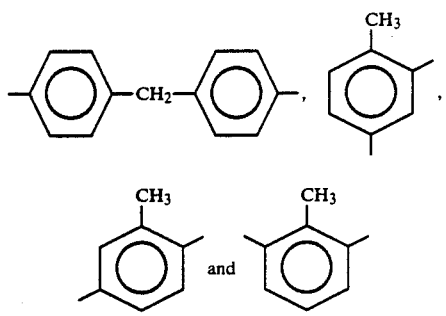

The molecular weight of the polyimide used according to the invention, preferably, has a mean numerical value of about 6,000 to 60,000 and a mean weight value of about 30,000 to 300,000.

The polyimide used according to the invention may be present in the powder mixture in an amount of between 10 and 90% by weight, preferably of between 50 and 70% by weight, the diameter of the polyimide particles being between 25 and 200 mym.

The metals that may be used are copper, bronze, steel, aluminum alloys and nickel alloys.

An advantageous embodiment of the method according to the invention consists in that the powder mixture of polyimide and metal is applied onto the surface to be coated by means of a plasma flame.

The preparation of the polyimide powder used according to the invention may be effected according to known techniques and is described, for instance, in U.S. Pat. No. 4,897,227. To dry moist polyimide powder or to adjust the desired content of emittable components, a high-frequency operated belt dryer or a vacuum operated drum drier may be used. The drying temperature of the polymer powder preferably lies below 300° C.

The invention will be explained in more detail by the following examples, a statistical copolymer of 3,3',4,4'-benzophenonetetracarboxylic acid dianhydride and 0.8% by mole 2,4-toluenediamine and 0.2% by mole 4,4'-diaminodiphenylmethane being used as the polyimide. The polyimide was ground to a powder having particle sizes of between 25 and 200 microns in a grinding and screening mill.

EXAMPLE 1

A polyimide powder prepared according to the method described in U.S. Pat. No. 4,897,227 served as a starting material. The adjustment of the content of emittable components was effected in a belt drier with an output of 10 kW at an electrode voltage of about 70 kV and a frequency of 27 MHz. The powder was dried in the belt drier, the temperature of the feed zone amounting to 50° C. and the temperature at the exit amounting to 40° C.

After a drying period of 45 min, the content of emittable components was 2.5% by weight. This value was determined by means of a thermogravimetric analytical instrument of Perkin-Elmer Corp. (heating rate 10° C./min; temperature range: 150° to 350° C.).

Subsequently, the polyimide powder was mixed with SiAl powder at a ratio of 60:40 and applied on steel grade ST50 by means of a plasma spraying device of Plasmatechnik AG (Switzerland), the following parameters having been observed:

Plasma gas: Ar (84 l/min and hydrogen (2 l/min)
Current consumption: 500 A at 53 V
Powder conveying rate: 50 to 60 g/min
Powder conveying gas: 10 l Ar/min
Distance burner-workpiece: 110 mm During plasma spraying, the surface of the workpiece was cooled with compressed air.

A high-temperature resistasnt coating of excellent quality having a hardness (HV) of 110 could be applied.

EXAMPLE 2

Starting material: as in Example 1, yet the content of emittable components was adjusted to 1.8% by weight in a heated vacuum drier (≦1 Torr) at a temperature of 250° C. The vacuum drier was a tumble drier (20 rpm). Drying was observed thermogravimetrically.

The polyimide powder obtained was plasma sprayed with SiAl powder as described in Example 1. A coating of equal quality could be applied.

At a comparative test, the content of emittable components was adjusted to 0.35% by weight (vacuum in tumbling drier: <1 mbar; temperature: 270° C.; drying time: 300 min). When plasma spraying such a polyimide powder, bonding could be achieved neither with the surface to be coated nor among the particles.

EXAMPLE 3

A polyimide prepared according to the method described in DE-C 21 43 080 was used as the starting material. The content of emittable components was adjusted to 2.9% by weight in a belt drier analogously to Example 1.

The polyimide powder obtained was plasma sprayed as described in Example 1, with SiAl powder, to form a coating of equal quality.

At a comparative test, the content of emittable components was adjusted to less than 1% by weight in a heated vacuum drier (vacuum: ≦1 mbar; temperature: 180° C.; drying time: 48 h). When plasma spraying such a polyimide powder, bonding could be achieved neither with the surface to be coated nor among the particles.

What we claim is:

1. A method of coating a surface comprising flame spraying onto said surface a powder mixture containing a metal and a polyamide, wherein said polyamide has a glass transition point of above 250° C. and contains low-molecular emittable components in an amount of at least 1.0% by weight.

2. A method as set forth in claim 1, wherein the amount of said low-molecular emittable components ranges between 1.0 and 10% by weight.

3. A method as set forth in claim 1, wherein said polyimide has structural units of the general formula

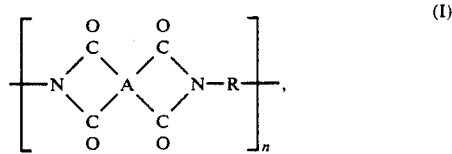

wherein n is an integer larger than 1 and A is a four-valent aromatic group selected from

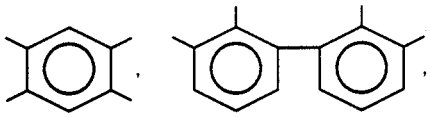

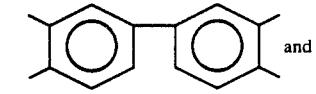

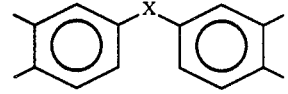

wherein X is selected from the group consisting of CO, $CH_2$, O, S and $CF_2$ and R represents at least one two-valent aromatic group selected from the group consisting of

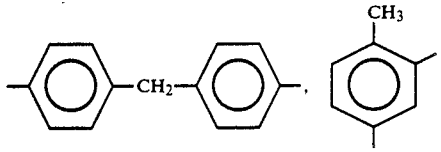

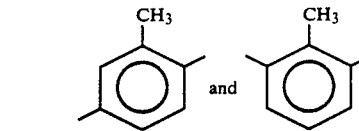

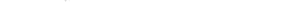

4. A method as set forth in claim 1, wherein said polyimide is comprised of particles having diameters of between 25 and 200 microns.

5. A method as set forth in claim 1, wherein said powder mixture contains said polyimide in an amount of between 10 and 90% by weight.

6. A method as set forth in claim 5, wherein said polyimide is contained in an amount of between 50 and 70% by weight.

7. A method as set forth in claim 1, wherein said metal is selected from the group consisting of copper, bronze, steel, aluminum alloys and nickel alloys.

8. A method as set forth in claim 1, wherein said flame spraying is performed by plasma flame spraying.

* * * * *